2,733,123

PRODUCTION OF UCl₄

Myron B. Reynolds, Glenville, N. Y., and Harold L. Pickering, Tulsa, Okla., assignors to the United States of America as represented by the United States Atomic Energy Commission No Drawing. Application April 8, 1948,
Serial No. 19,883

5 Claims. (Cl. 23—14.5)

The present invention relates to activated uranium dioxide and refers particularly to the process of producing a highly active form of $UO_2$ which is characterized by rapid oxidation in air and rapid chlorination at elevated temperature.

Commercial $UO_2$ is ordinarily in the form of chocolate brown powder and does not possess the reactivity which characterizes the activated form of $UO_2$ produced by this process. In fact commercial $UO_2$ is stable in ordinary air at room temperature and exhibits no tendency to oxidize in ordinary air until it is heated to a temperature of the order of 100° C., under which conditions it is oxidized to the black oxide $U_3O_8$ in accordance with the following reaction:

$$3UO_2 + O_2 \rightarrow U_3O_8$$

Similarly, ordinary commercial forms of $UO_2$ may be chlorinated only at a moderate rate with $CCl_4$ vapor to produce $UCl_4$; whereas the activated form of $UO_2$ produced by this invention may be rapidly chlorinated with $CCl_4$ vapor to produce $UCl_4$.

Accordingly, it is an object of this invention to provide an activated form of $UO_2$.

Another object of the invention is to provide a highly active form of $UO_2$ which is characterized both by rapid oxidation in ordinary air at room temperature and rapid chlorination at an elevated temperature.

A further object of the invention is to provide a process for producing an activated form of $UO_2$ from $UO_3$.

A still further object of the invention is to provide a process for producing a highly activated form of $UO_2$ which is characterized by rapid oxidation in ordinary air at room temperature and rapid chlorination with $CCl_4$ vapor at an elevated temperature.

And a still further object of this invention is to provide a process for producing a highly active form of $UO_2$ which is particularly well suited for use as an intermediate in the production of $UCl_4$.

Another further object of the invention is to provide a process of converting $UO_3$ to $UCl_4$ by reducing $UO_3$ to the highly active $UO_2$ and then subsequently chlorinating the activated $UO_2$ thus produced.

Still further objects of the present invention will be apparent from the following description taken in connection with the appended claims.

Broadly the objects of this invention are accomplished by treating $UO_3$ with an alcohol such as ethyl alcohol under optimum conditions and subsequently chlorinating the highly active form of $UO_2$ with $CCl_4$ or $SOCl_2$ at elevated temperatures. The reduction of $UO_3$ to a highly active form of $UO_2$ with ethyl alcohol may be carried out under various conditions such as various temperatures, pressures, physical forms, and with various diluents and/or carriers. Although this reduction and activation may be accomplished over a range of temperature the optimum temperature for accomplishing the above stated objects has been ascertained to be between 200° C. and 425° C. and more particularly between 290° C. and 350° C. Also, although this process may be carried out without a diluent and/or carrier such as nitrogen gas, it has been ascertained that the reduction of $UO_3$ with ethyl alcohol can be carried out and controlled more readily and efficiently using nitrogen gas as the diluent and/or carrier.

The subsequent chlorination is usually performed at elevated temperatures between 250° C. and 500° C. with either $CCl_4$ or $SOCl_2$. Carbon tetrachloride is usually employed as the chlorinating agent, as $SOCl_2$ although a somewhat more reactive agent, in practice, is more difficult to handle than $CCl_4$.

Prior to the chlorination and subsequent to the reduction the system may be purged by blowing a pure inert gas such as nitrogen over the activated $UO_2$.

More specifically in accordance with the present invention the active form of $UO_2$ is prepared by reducing $UO_3$ in a rotating kiln-type reactor of stainless steel by the addition of ethanol either as a liquid from a dropping funnel connected through a metal tube to the reactor chamber or as a vapor by means of a carrier gas, such as $N_2$, which is bubbled through the ethanol heated to the proper temperature. Nitrogen is used as a diluent primarily to eliminate hazards of explosion should $O_2$ be introduced into the system accidently and as a means to feed ethanol to the reaction and to assist in controlling the rate and temperature of the reaction. It is possible to obtain satisfactory control over the temperature of the exothermic reduction reaction by proper adjustment of furnace temperature, flow rate of $N_2$ and the temperature of the bath employed to heat the alcohol. When the latter method, that of using $N_2$ carrier, is employed, the rate of introduction of the ethanol may be controlled by the flow of $N_2$ nd by the temperature to which the ethanol is heated. Since the reaction is exothermic, heat is evolved during the reaction and the internal temperature in the initial stages of the reaction is determined largely by the rate at which the ethanol is introduced. The temperature of the reacting mass is measured by means of a thermocouple contained in a thin-walled shielding tube placed in the vapor phase over the reacting charge. The external reactor temperature is measured by a couple placed between the reactor and furnace core and is controlled through a recording potentiometer. As the reaction tapers off, the furnace temperature is brought up to a predetermined or optimum internal reaction temperature.

The optimum temperature for the most efficient and best reduction of $UO_3$ with ethanol and the optimum temperature for the preparation of the most active form of $UO_2$ by the reduction of $UO_3$ with ethanol was ascertained by carrying out a number of reductions at various temperatures and testing the activity of the $UO_2$ formed. The results of these reductions indicate that the optimum temperature of reduction is between 200° C. and 425° C. At low temperatures it was observed that the reduction of $UO_3$ to $UO_2$ proceeded stepwise; black $U_3O_8$ is formed first at as low a temperature as 150° C.; and conversion to brown $UO_2$ takes place slowly at this temperature and more rapidly as the temperature is raised.

Utilizing this optimum temperature range for the best production of a highly active form of $UO_2$ through the reduction of $UO_3$ with ethanol a series of combined reduction and chlorination experiments were carried out giving the results listed in the table. These results show that activated $UO_2$ obtained by reducing $UO_3$ with ethanol by the process of this invention is an excellent intermediate for the conversion of $UO_3$ to $UCl_4$. The reduction and chlorination operations were carried out in the same rotating kiln-type reactor of stainless steel. In general 1420 grams of $UO_3$, 150 to 200 cc. of ethanol and 800 cc. of $CCl_4$ were used in the combined reduction and subsequent chlorination operations. One convenient method of obtaining $UO_3$ comprises calcination of uranium peroxide. Experiment No. 15 of the table showing a low reduction temperature is taken as a typical and illustrative example of the other experiments. In this experiment a 1420 gram charge of $UO_3$ heated to 150° C. in the rotating kiln-type reactor was reduced to active $UO_2$ by the introduction of ethyl alcohol vapor in a nitrogen gas carrier to the reactor. The rate of introduction of nitrogen gas carrier, introduced through the ethyl alcohol chamber which was maintained at 69° to 74° C., and then into the reactor was varied between 5 and 7.5 cc. per second to raise and maintain the temperature of the reaction mass between 295° C. and 340° C. At the end of the eighty minutes after approximately 150 to 200 cc. of ethanol had been introduced into the reactor the reduction operation was substantially complete, and the system was purged by blowing pure nitrogen gas through the reactor. The activated $UO_2$ is then chlorinated by introducing $CCl_4$ into the reactor in liquid form without a carrier at such a rate as to maintain the reaction temperature at approximately 400° C.; the furnace temperature being increased gradually to 400° C. as the reaction tapers off. A chlorination temperature of approximately 400° C. appears to be most satisfactory. At lower temperatures the reaction proceeds too slowly; whereas at higher temperatures, the losses from the reaction chamber increase materially. As the chlorination reaction is also exothermic, the reaction temperature may be controlled by the rate at which $CCl_4$ is introduced and by the furnace temperature. At the end of ninety minutes after approximately 800 cc. of $CCl_4$ had been introduced into the reactor the chlorination operation is substantially complete. Analysis of the results of this experiment show, as was noted also in the other experiments listed in Table I that the recovery of usable product averaged around 99%, of which 99% was the uranium tetrachloride desired. The results of these combined reduction and chlorination operations are listed in the following table.

Table

| Exp. No. | Reduction | | | Chlorination | | | Product, Percent Nonvolatile | |
|---|---|---|---|---|---|---|---|---|
| | Av. Temp. | Max. Temp. | Time, Min. | Av. Temp. | Max. Temp. | Time, Min. | $UO_2$ | C |
| 1 | 380 | 410 | 90 | 395 | 405 | 125 | 1.20 | 0.40 |
| 2 | 360 | 385 | 62 | 440 | 455 | 90 | 1.20 | 0.03 |
| 3 | 360 | 390 | 80 | 400 | 415 | 95 | 1.87 | 0.15 |
| 4 | 355 | 385 | 80 | 395 | 410 | 95 | 1.82 | 0.25 |
| 5 | 355 | 390 | 90 | 405 | 420 | 95 | 1.03 | 0.19 |
| 6 | 350 | 370 | 85 | 395 | 410 | 95 | 0.63 | 0.39 |
| 7 | 345 | 360 | 65 | 395 | 405 | 95 | 1.24 | 0.35 |
| 8 | 340 | 365 | 65 | 395 | 410 | 150 | 0.90 | 0.42 |
| 9 | 335 | 365 | 60 | 385 | 400 | 90 | 0.63 | 0.49 |
| 10 | 325 | 350 | 65 | 395 | 405 | 90 | 0.83 | 0.44 |
| 11 | 305 | 335 | 75 | 445 | 463 | 87 | 0.24 | 0.42 |
| 12 | 300 | 335 | 80 | 410 | 455 | 90 | 0.07 | 0.68 |
| 13 | 300 | 345 | 85 | 395 | 415 | 100 | 0.27 | 0.93 |
| 14 | 300 | 335 | 80 | 400 | 420 | 90 | 0.53 | 0.84 |
| 15 | 295 | 340 | 70 | 400 | 415 | 95 | 0.29 | 0.83 |
| 16 | 290 | 335 | 95 | 395 | 410 | 110 | 0.92 | 0.42 |

An analysis of the table clearly shows that activated $UO_2$ prepared by reducing $UO_3$ with ethanol is a most excellent intermediate for producing $UCl_4$ from uranium compounds such as $UO_3$ and that the optimum reduction temperature at which the most active form of $UO_2$ is obtained as tested by chlorination with $CCl_4$ vapor is between 290° C. and 350° C.

The highly active form of $UO_2$ produced in accordance with the present process is far superior in activity to the commercial $UO_2$. This fact is readily evidenced by the special properties of the activated $UO_2$ as contrasted with the ordinary properties of commercial $UO_2$. For example, this activated $UO_2$ is rapidly oxidized in ordinary air at room temperature, producing $U_3O_8$ whereas commercial $UO_2$ exhibits no oxidation in ordinary air until it is heated to a temperature of the order of 100° C. Also, this activated $UO_2$ may be rapidly and efficiently chlorinated with $CCl_4$ vapor to produce $UCl_4$; whereas commercial $UO_2$ may be chlorinated only at a moderate rate and much less efficiently.

Having broadly and specifically disclosed the present invention, it is apparent that many modifications and departures may be made without departing essentially from the nature and scope thereof as may be included within the following claims and it is intended to cover in the appended claims all such modifications as fall within the true spirit and scope of the disclosed invention.

We claim:

1. The process for producing a highly active form of $UO_2$ which is characterized by rapid oxidation in ordinary air at room temperature and rapid chlorination with carbon tetrachloride at approximately 400° C., comprising reducing $UO_3$ with a mixture of ethyl alcohol and an inert gaseous diluent at 200° to 425° C.

2. The process for producing a highly active form of $UO_2$ which is characterized by rapid oxidation in ordinary air at room temperature and rapid chlorination with carbon tetrachloride at approximately 400° C., comprising reducing $UO_3$ with a mixture of ethyl alcohol and nitrogen at a temperature within the range of 295° C. to 350° C.

3. The process of converting $UO_3$ to $UCl_4$ which comprises reducing $UO_3$ with ethanol at 200° to 425° C., and chlorinating the activated $UO_2$ formed with carbon tetrachloride at 250° to 500° C.

4. The process of converting $UO_3$ to $UCl_4$ which comprises reducing $UO_3$ with ethyl alcohol in a nitrogen diluent at temperatures ranging from 290° C. to 350° C. and chlorinating the highly active form of $UO_2$ produced with carbon tetrachloride at temperatures ranging from 390° C. to 420° C.

5. The process of converting $UO_3$ to $UCl_4$ which comprises passing nitrogen gas through a bath of ethanol maintained at a temperature of 65° to 75° C. introducing the nitrogen diluted ethanol vapors thus produced into a reactor containing $UO_3$ heated to a temperature between 150° C. and 300° C. at a rate sufficient to raise and maintain the temperature at which $UO_3$ is being reduced between 290° C. and 350° C., blowing a current of pure nitrogen through the reactor after the reduction of $UO_3$ to $UO_2$ has been completed; and introducing $CCl_4$ into the reactor to chlorinate the highly active form of $UO_2$ at a rate sufficient to maintain a reaction temperature between 390° C. and 420° C.

References Cited in the file of this patent

UNITED STATES PATENTS

| 1,989,759 | Logue et al. | Feb. 5, 1935 |
| 2,064,317 | Oxley et al. | Dec. 15, 1936 |

OTHER REFERENCES

Michael et al.: American Chemical Journal, vol. 44, page 384 (1910).

Hopkins: Chapters in the Chemistry of the Less Familiar Elements, vol. II, chapter 18, Uranium, page 11. Published in 1939 by Stipes Publishing Company, Champaign, Illinois.

Ivannikov Chemical Abstrats, vol. 34, page 7847 (1940).